United States Patent [19]
Becker

[11] 3,762,246
[45] Oct. 2, 1973

[54] FLANGE FACING MACHINE
[75] Inventor: Anthony F. Becker, Houston, Tex.
[73] Assignee: DND Corporation, Chicago, Ill.
[22] Filed: July 2, 1971
[21] Appl. No.: 159,126

[52] U.S. Cl. .................................. 82/4 C, 33/181
[51] Int. Cl. ............................................. B23b 3/24
[58] Field of Search ............................. 82/4 C, 4 R

[56] References Cited
UNITED STATES PATENTS
| | | | |
|---|---|---|---|
| 145,103 | 12/1873 | Henderson et al. | 82/4 C |
| 2,451,729 | 10/1948 | Gardner | 82/4 C |
| 3,181,398 | 5/1965 | Rogers | 82/4 C |

FOREIGN PATENTS OR APPLICATIONS
| | | | |
|---|---|---|---|
| 832,988 | 3/1952 | Germany | 82/4 |
| 819,483 | 10/1951 | Germany | 82/4 |

*Primary Examiner*—Leonidas Vlachos
*Attorney*—Pravel, Wilson & Matthews

[57] ABSTRACT

A portable compact machine for resurfacing the faces of flanges on pipes and/or valves, wherein a base is releasably mounted in the bore of the pipe or valve in alignment therewith for accurate cutting of the flange face with a lathe tool, and wherein the tool is automatically fed radially as it is rotated by a power means mounted on a support column removably positioned on the base.

8 Claims, 7 Drawing Figures

Anthony F. Becker
INVENTOR

BY

Pravel Wilson & Matthews
ATTORNEYS

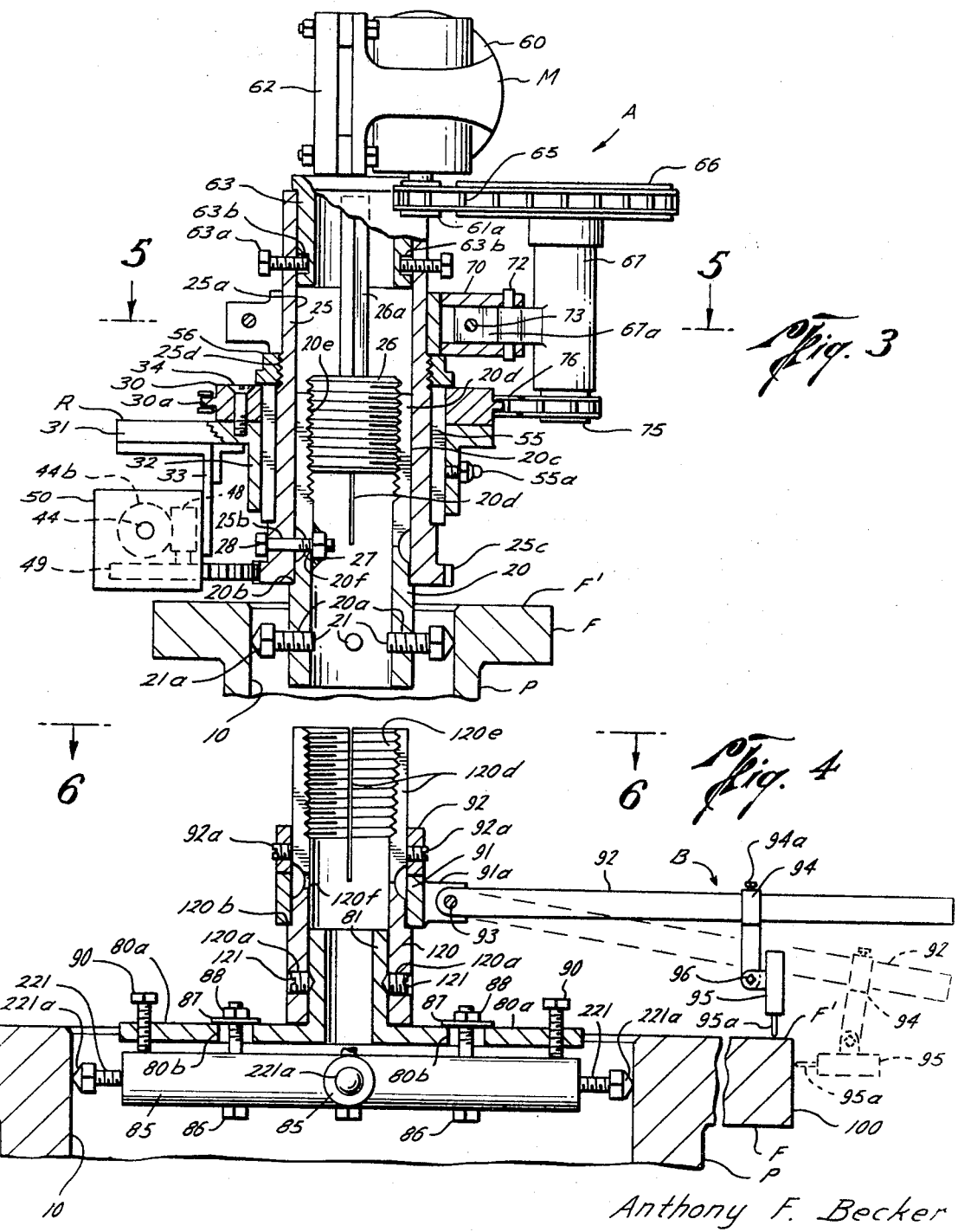

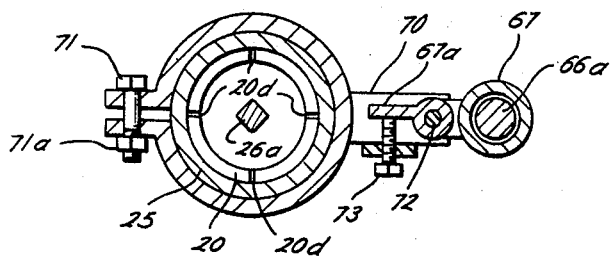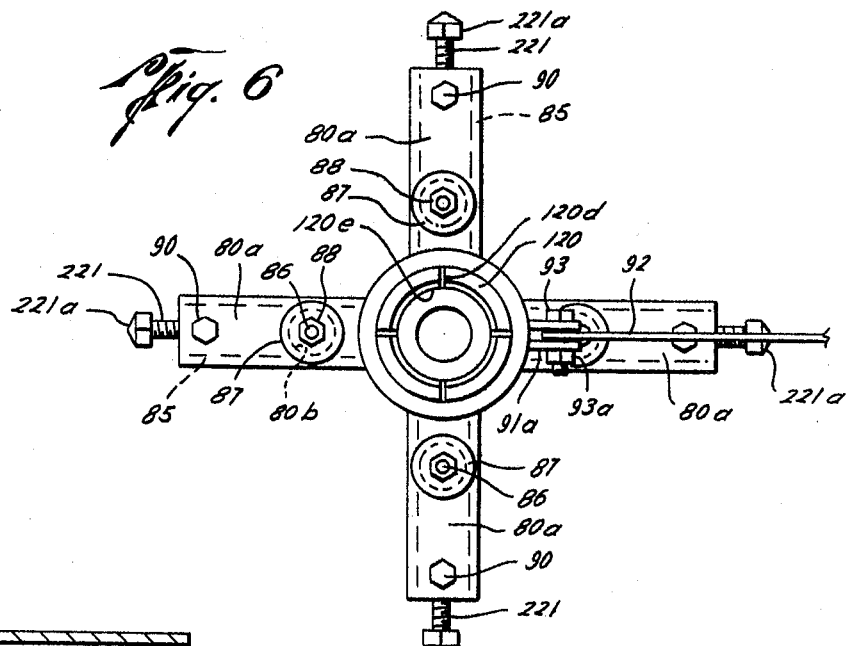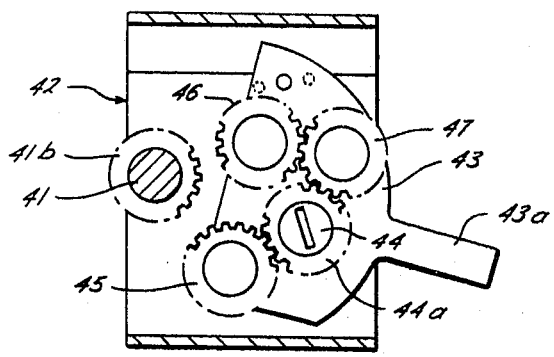
NEUTRAL POSITION

FLANGE FACING MACHINE

BACKGROUND OF THE INVENTION

The field of this invention relates to machines for resurfacing the face of a flange on a pipe or valve.

Although efforts have been made in the past to provide refacing machines and related apparatus, such as illustrated in U. S. Pat. Nos. 2,436,152; 2,478,310; 2,518,929; 3,141,365; 3,181,398; 3,202,190; 3,273,432; 3,324,749; 3,540,329, so far as is known, none of the prior workers have provided a relatively simple compact flange facing machine adapted to be positioned and aligned in the smooth bore of a pipe or valve, wherein a cutting or facing tool is operated for automatic radial feeding in response to the rotation of the tool.

SUMMARY OF THE INVENTION

The present invention relates to a flange facing machine for cutting or resurfacing the face of a flange on a tubular member such as a pipe or valve having a smooth bore, wherein the machine has means for accurately aligning a base in such bore so that precise machining of the flange face can be accomplished. The flange facing machine has a support column which is releasably mounted on the base and upon which a rotatable frame is mounted with a cutting tool for the resurfacing of the flange face. The rotatable frame is driven by a power means such as an electric or hydraulic motor mounted on the support column, and the tool is automatically fed radially as it is rotated.

BRIEF DESCRIPTION OF THE DRAWINGS

FIG. 3 is a side view of the apparatus of FIGS. 1 and 2, partly in section and partly in elevation, showing further details of the flange facing machine of this invention;

FIG. 4 is a sectional view, partly in elevation, of a modified base which may be used with the apparatus of FIGS. 1-3, together with an alignment means for aligning such base with respect to the bore of the pipe or valve upon which it is mounted;

FIG. 5 is a cross-sectional view taken on line 5—5 of FIG. 3;

FIG. 6 is a view taken on line 6—6 of FIG. 4, omitting the pipe of FIG. 4 for purposes of illustration; and FIG. 7 is an elevation, partly in section, of a gear control for the feeding of the cutting tool used with the machine of this invention.

DESCRIPTION OF THE PREFERRED EMBODIMENTS

Figure 1:
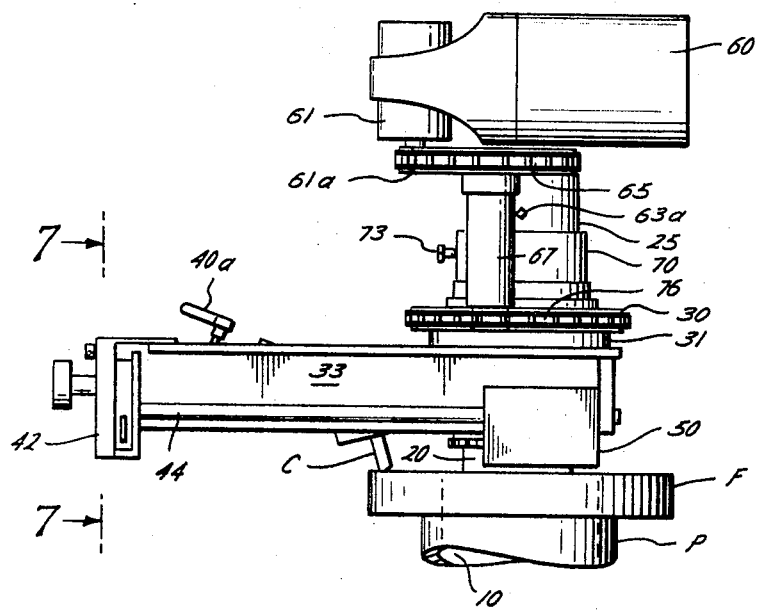
FIG. 1 is an elevation of one form of the apparatus of this invention shown in position for the resurfacing or cutting of a flange on a pipe or valve.
Figure 2:
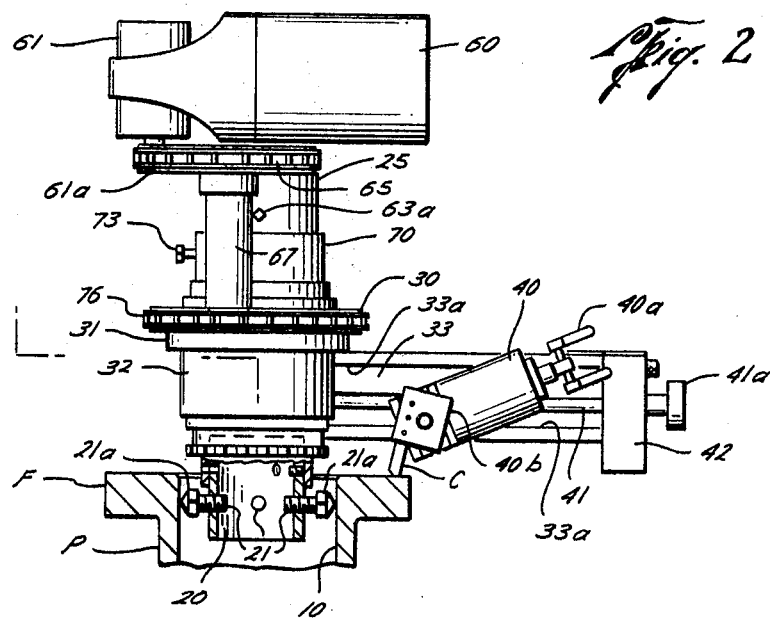
FIG. 2 is a view similar to FIG. 1, but showing the cutting tool in a position substantially 180 degrees from that shown in FIG. 1, and also showing the base and releasable connecting means of the machine of this invention in section.

In the drawings, the letter A designates generally the apparatus of this invention as shown in FIGS. 1-3 which is adapted to be used for the cutting or resurfacing of the face F' of a flange F which is with a pipe, valve or other tubular member P having a smooth inner bore 10. The apparatus A includes a conventional cutting tool C (FIGS. 1 and 2) which may be a conventional lathe cutting tool for cutting steel and other similar materials. As will be explained in detail, the apparatus A is initially positioned with a portion of it in the bore 10 of the pipe or other tubular member P so as to be accurately aligned for precise machining of the face F' of the flange F by a rotation of the cutting tool as well as an automatic radial movement of such cutting tool C during the rotation thereof.

The apparatus A includes a base 20 (FIGS. 2 and 3) which preferably is a cylinder having a plurality of releasable connecting members 21 therewith. Preferably there are four of the releasable connecting members 21, each of which has a head 21a which is usually in a conical pointed shape for engaging the inside surface of the bore 10 of the pipe P. Each member 21 has threads thereon which are in threaded engagement with threaded openings 20a in the base 20 so that such members 21 may be threaded inwardly and outwardly for releasably engaging the inside surface of the bore 10 as will be more fully explained. Preferably there are four of such threaded connecting members 21 which are disposed diametrically opposite to each other to facilitate the shifting of the base 20 to vertically align the central axis of the base 20 with respect to the central axis of the pipe P. As will be explained in detail hereinafter in connection with the modification of FIG. 4, an alignment means B (FIG. 4) may be employed with the base 20 prior to the assembly of any of the other apparatus A therewith so as to initially align the base 20 with the pipe P.

The base 20 is adapted to releasably receive thereon a tubular column support 25 which preferably seats upon a shoulder 20b on the base 20. The external surface 20c is of a smaller diameter than the inner diameter 25a of the column support 25 so that initially, the column support 25 may be readily lowered into position over and onto the base 20 until it reaches the shoulder 20b. For securely clamping and locking the support column 25 to the base 20, the base 20 is provided with a plurality of longitudinal slots 20d at its upper end so as to render the upper end of the base 20 radially expansible outwardly. The inner surface 20e of the base 20 is threaded and is of a substantially uniform diameter throughout its threaded portion. An expander plug or member 26 having threads thereon which are tapered downwardly and inwardly is adapted to be inserted into the threads 20e so that the lower portion of the threads on the expander 26 can initially enter the threads 20e without any appreciable expansion of the resilient upper portion of the base 20, but as the plug 26 is threaded downwardly relative to the base 20, the wedging action of the tapered threaded member 26 causes the resilient upper portion of the base 20 to expand outwardly. Such outward radial expansion of the upper portion of the base 20 causes a frictional engagement between the external surface 20c and the internal surface 25a to frictionally hold the base 20 and the tubular column support 25 together. Thus, the tubular column support 25 is effectively aligned in the same alignment as the base 20.

For safety purposes, the base 20 has a nut 27 welded internally thereof in alignment with an opening 20f in the wall of the base 20 for receiving a bolt 28 which extends through a suitable opening 25b in the wall of the support column 25. The openings 25b and 20f are aligned, and normally, the bolt 28 is threaded into the nut 27 prior to the expansion of the upper portion of the base 20 by the downward rotation of the expander 26, as previously explained. It is to be noted that the expander 26 has a shaft 26a therewith which has one or more flat sides for engagement by a wrench or similar tool to facilitate rotation of the expander member 26. It will be appreciated that other means for rotating such expander 26 would be suitable and could be provided in lieu of the shaft 26a.

A rotatable frame R is mounted on the support column 25 for rotation relative thereto. As illustrated in the drawings, the rotatable frame includes a ring gear 30 having gear teeth 30a externally thereof. The ring gear 30a is connected to a bracket 31 which has a ring portion 32 and a longitudinally extending arm 33. Such connection is preferably provided by one or more screws 34 (FIG. 3). The bar 33 is in effect a conventional carriage for a lathe cutting tool mechanism 40 which adjustably supports the cutting tool C in a known manner. The lathe supporting mechanism 40 is adapted to move substantially horizontally as viewed in FIGS. 1 and 2 relative to the carriage 33 in ways or other conventional beveled guides 33a on the carriage 33 which are engaged by corresponding inter engaging guides on the mechanism 40 in the known manner. The mechanism 40 is moved radially along such carriage 30 by the rotation of a threaded shaft 41 which is connected into a gear box 42, the details of which will be hereinafter described (FIG. 7). Such shaft 41 may also be rotated manually by a control knob 41a in the conventional manner for moving the lathe support mechanism 40 inwardly and outwardly along the carriage 33. The mechanism 40 has internal gearing of conventional construction which is controlled by a handle 40a in the known manner to adjust the angle of the cutting tool C with respect to the work which is to be cut by the cutting tool C, in the known manner. Also, a movable plate 40b is provided on the mechanism 40 of conventional construction for further providing adjustments to the angle and position of the cutting tool C with respect to the rest of the mechanism 40 as will be well understood by those skilled in the art. Referring now to the gear box 42, the shaft 41 has a gear 41b thereon which is rotatable therewith. An assembly of gears are mounted on a pivoted plate 43 having a control lever 43a therewith. The plate 43 is pivotally mounted on and is connected to a drive shaft 44 (FIGS. 1, 3 and 7), and such shaft has a gear 44a which is rotatable therewith. A first gear 45 is rotatably mounted on the plate 43 in engagement with the gear 44a so that when the gear 45 is in engagement with the gear 41b, rotation of the shaft 44 is imparted to the shaft 41 in a direction to move the cutting tool C radially inwardly towards the bore 10 of the pipe or other tubular member. A second gear 46 is rotatably mounted on the plate 43 and it is connected through an idler gear 47 which is also rotatably mounted on the plate 43 and which engages the gear 44a so that when the gear 46 is engaged with the gear 41b, the rotation of the shaft 44 is transmitted to the shaft 41, but in an opposite direction to the rotation which is transmitted through the shaft 45 to thereby cause the cutting tool C to reverse its travel and move radially outwardly with respect to the bore 10 of the pipe P or other tubular member. As illustrated in FIG. 7, both of the gears 45 and 46 may be disconnected from the gear 41b, which is the neutral position, so that a manual movement radially of the lathe mechanism 40 may be accomplished by the rotation of the handle 41a independently of the movement of the shaft 44. When the lever 43a is moved downwardly from the position shown in FIG. 7, the plate 43 is rotated to move the gear 45 into engagement with the gear 41b. An upward movement of the lever 43a from the neutral position shown in FIG. 7 results in an engagement of the gear 46 with the gear 41b.

The shaft 44 extends into a gear housing 50 (FIG. 1) and it has therein a wormgear 44b mounted thereon for engagement with a worm 48 which is connected to and which is driven by a gear 49 which in turn is in operable engagement with an external ring gear 25c on the support column 25, as will be more evident hereinafter. As will be explained hereinafter, upon a rotation of the rotatable frame R, the ring gear 49 is rotated by reason of its engagement with the ring gear 25c so as to cause a rotation of the shaft 44 which is transmitted to the shaft 41, depending upon the position of the gears in the gear box 42, as previously explained.

Preferably, a sleeve bearing 55 or other suitable type of bearing means is provided between the rotatable frame R and the external surface of the support column 25 so as to have a relatively anti-friction mounting therebetween. The sleeve 55 may be a bronze lubricated sleeve and preferably a lubrication fitting 55a is provided for introducing lubricant to the bearing sleeve 55. The bearing sleeve 55 is retained in position as illustrated in FIG. 3 and the ring gear 30 is likewise retained in position by means of a nut 56 which is threaded onto the external surface of the tubular column support 25 at threads 25d.

For rotating the rotatable frame R, power means M is provided which in the form of the invention illustrated includes either an electric or hydraulic motor 60 which is connected through suitable gearing in a gear housing 61 to a drive sprocket 61a. The motor 60 is supported on a mounting bracket generally designated at 62 which is suitably connected to a support sleeve 63 which fits within the bore of the support column 25 and which is preferably anchored thereto by one or more bolts 63a as shown in FIG. 3. The sprocket 61a has a chain 65 engaged therewith and which extends to a larger sprocket 66 mounted on a rotatable shaft in a sleeve 67 (FIGS. 3 and 5). The sleeve 67 is pivotally mounted on a ring bracket 70 which is releasably clamped to the external surface of the support column 25 by a clamping bolt 71 having a nut 71a therewith (FIG. 5). The sleeve 70 is pivotally connected through a pivot pin 72 to such bracket 70, and the position of such sleeve 67 is set by adjustable screw or bolt 73 which fits in the bracket 70 and engages a lever 67a which is integral with the sleeve 67.

The shaft 66a which is shown in FIG. 5 extends downwardly through the sleeve 67 and it has a sprocket 75 thereon below the sleeve 67 which receives another chain 76 that is disposed in engagement with the teeth 30a of the ring gear 30. By the adjustment of the screw 73, it can be seen that the sleeve 67 may be pivoted outwardly about the pivot pin 72 to control the tightness of the chains 65 and 76 on their respective sprockets so as to assure a positive drive from the motor 60 to the ring gear 30 at all times. Also, by a release of the bolt or screws 73 so as to permit a pivoting of the sleeve 67 inwardly towards the support column 25, the chains 65 and 76 may be placed in a slack condition so that they can be readily removed without taking the chains apart, when it is desired to disassemble the apparatus for replacement or repair. It should be noted that although the chain drive which includes the two chains 65 and 76 is preferable in view of the positive drive action which is obtained, it will be appreciated by those skilled in the art that an equivalent drive means may be provided directly from the motor 60 to the ring gear 30.

In the operation or use of the apparatus A as illustrated in FIGS. 1–3, 5 and 7 in particular, the base 20 is initially positioned in the bore 10 prior to mounting any of the other apparatus A thereon. The base 20 is releasably secured to the bore 10 of the pipe P or other tubular member by means of the threaded connecting members 21, as previously explained, and preferably, the base 20 is aligned at that point with the bore of such tubular member P. Such alignment may be accomplished with the alignment mechanism B illustrated in FIG. 4 as will be more fully described hereinafter.

After the base 20 has been secured within the bore 10, the support column 25 is next positioned on the base 20. The support column 25 may already have assembled therewith the rotatable frame R, the nut 56, the bearing 55, the bracket 70 and the sleeve 67 with the sprockets 66 and 75. The bolt 28 is then threaded into the nut 27. The plug or expander 26 is introduced through the open upper end of the support column 25 since the power means M is not normally in position on the apparatus A at that time. The shaft 26a is rotated using a wrench or other similar tool to rotate and thread the expander 26 downwardly into the threads 20e to thereby outwardly expand the upper portion of the base 20 for frictionally engaging the inside surface of the support column 25 to lock the column 25 to the base 20.

Thereafter, the power means M is positioned as shown in FIG. 3, with the cylindrical sleeve 63 disposed in the bore of the support column 25. The connecting bolts 63a are then threaded inwardly so as to engage a recess 63b of the sleeve 63. The chains 65 and 76 are disposed on the sprockets 61a, 66 and 75, 30a, with the screw 73 threaded outwardly from its position shown in FIG. 5 so that such chains 65 and 76 may be connected to their respective sprockets while they are in a slack condition. Thereafter, the screw 73 is threaded inwardly to force the sleeve 67 to pivot about the pivot pin 72 to tighten the chains 65 and 76 on their respective sprockets.

Power is then supplied to the motor 60 to drive the chains 65 and 76 and thus to drive the ring gear 30 and rotate the rotatable frame R relative to the support column 25. The rotation of the frame R rotates the cutting tool C relative to the face F' of the flange F and by reason of the coaction between the ring gear 25c and the gears connected therewith, as previously explained, the cutting tool C is moved radially either inwardly or outwardly depending upon the position of the gears in the gear box 42. Thus, with the gear 45 engaged with the gear 41d, the shaft 41 is rotated so as to move the cutting tool mechanism 40 and the cutting tool C therewith radially inwardly. On the other hand, when the gear 46 is engaged with the gear 41b, the cutting tool C and the mechanism 40 are moved radially outwardly. Such radial movement of the cutting tool C in either direction is automatic and is in response to the rotation of the rotatable frame R so that there is in effect an automatic spiral feeding of the cutting tool C either inwardly or outwardly, depending upon the starting point for the cutting tool C. The cutting tool C may be initially positioned for starting the cutting action at the outermost point on the face F' of the flange F and it may be operated so as to move radially inwardly for the full surface of the face F'. Then, the gears in the gear box 42 may be shifted by shifting the lever 43a to reverse the radial direction of movement of the cutting tool C so that it moves radially outwardly. The depth of the cut of the cutting tool C as it moves radially is determined by the initial setting for each pass thereof, which is accomplished in the conventional manner by the manipulation of the handle 40a and/or the setting of the plate 40b.

In FIGS. 4 and 6, a modified base 120 is illustrated together with the alignment means B. The base 120 may actually be the same as the base 20 of FIG. 3, and is so illustrated, with like parts having the same numbers, except that they are preceded by the prefix 1. The openings 120a are threaded like the openings 20a for receiving a plurality of set screws 121 for releasably locking the base 120 to an adjustment platform 80 which has a tubular portion 81 therewith, extending upwardly into the bottom of the bore of the base 120 as shown in FIG. 4. The shoulder 120b corresponds with the shoulder 20b, and the upper portion of the base 120 is slotted at 120d and it is internally threaded at 120e in the same manner as the base 20.

The adjustment platform is mounted upon a spider which is illustrated as having four spider arms 85 (FIG. 6), at the end of which is a threaded connecting member 221. Such connecting members 221 have threads and are threaded into corresponding thread openings in the spiders 85 therewith so that they may be threaded inwardly and outwardly so that each head 221a may engage the bore 10 of the pipe P or other tubular member. Such connection to the bore 10 is thus substantially the same as that provided by the connecting members 21 in FIGS. 2 and 3.

The platform 80 is adjustable with respect to the spider arms 85 after the spider arms 85 have been secured in the bore 10 by the engagement of the connecting members 221 with the bore 10. Thus, with the form of the invention illustrated in FIG. 4, the spider arms 85 may be initially positioned in approximately the desired position so as to approximately locate the central axis of the base 120 substantially in alignment with the central axis of the bore 10 of the pipe P. Because of the adjustable connection between the spider formed by the spider arms 85 and the platform 80, as will be explained, the exact alignment of the base 120 may thereafter be accomplished.

Thus the platform 80 includes a leg 80a disposed over each of the arms 85 and which are connected thereto by bolts 86 which extend through openings 80b, with a washer 87 and a nut 88 disposed above each leg 80a. The hole 80b for each of the bolts 86 is larger than the diameter of the bolt 86 so that the entire platform 80 may be shifted laterally relative to the spider formed by the arms 85. Adjustment screws 90 are threaded through suitable openings in each of the legs 80a for maintaining the platform 80 at the desired elevation with respect to the spider arms 85. Thus, if it is desired to shift the base 120 laterally with respect to the spider arms 85, it is simply necessary to loosen the nuts 88 and then to retighten them when they have been moved to the new position. Should it be desired to tilt the base 120 for aligning the central axis thereof with the central axis of the bore of the pipe P, this may be readily accomplished by loosening the nut 88 on the side which is to be raised and then by unthreading or backing out the screw 90 on the opposite leg 80a therefrom. The screw 90 on the leg 80 with the nut 88 which has been loosened is then tightened or threaded inwardly until the leg 80a with the loosened nut 88 again reaches a stop point in engagement with the washer 87 therewith. At that point, the nut 88 on the opposite leg 80a is tightened down to the new position and the screw 90 on such opposite leg 80a is also screwed downwardly or is returned to contact with the spider arm 85 therebelow. Thus, the platform 80 is then locked again in the new position. It will be appreciated that this may be accomplished for any direction of tilt which is desired, using the opposite legs 80a for any combination of tilting movements.

The alignment means B which is preferably used for the alignment of the base 120 includes a rotatable collar 91 which is disposed on the external surface of the base 120 and which rests upon the shoulder 120b so that the collar 91 may rotate relative to the base 120. Preferably, a retaining ring 92 having locking screws 92a therewith is disposed above the collar 91 for holding the collar 91 in a fixed vertical position as it is rotated relative to the base 120. The set screws 92a are of course threaded inwardly into frictional engagement with the base 120 to thereby releasably lock the ring 92 in the position above the collar 91. The collar 91 has a clevis 91a therewith (FIGS. 4 and 6), to which is pivotally connected an alignment arm 92 by means of a bolt 93 and a nut 93a therewith. The nut 93a is preferably tightened so that the alignment arm 92 is frictionally held between the two arms of the clevis 91a so that the arm 92 may be pivoted about the bolt 93 with sufficient restraint so that the arm 92 will not thereafter pivot by itself once it has been moved to a selected position.

A sliding holder 94 is releasably secured to the arm 92 by a set screw 94a for holding a gage 95 and a contact member 95a therewith in a position for normally contacting the face F' of the flange F. The pressure gage 95 may be mounted on the alignment arm 92 in any suitable manner, but as illustrated it is attached by a releasable bolt or screw 96 so that it may be moved from the solid line position of FIG. 4 to the dotted line position when it is desired to have the contact member 95a engage the outer annular surface or edge 100 of the flange F (FIG. 4).

The gage 95 may be a conventional gage which has a pointer and a dial (not shown) so that an operator may read the amount of pressure exerted by the contact member 95a at various points throughout the rotation of the contact member 95a with respect to the flange face F' or the annular edge 100. Thus, if the gage 95 reads the same throughout a full rotation thereof with the contact member 95a in contact with the face F', This is an indication that the face F' is perpendicular to the central axis of the bore 10 and therefore, the central axis of the bore 10 is parallel to the central axis of the base 120. Then, when the gage 95 reads substantially the same throughout a full revolution thereof with the contact member 95a in contact with the surface 100 or a similar surface, this would indicate that the central axis of the base 120 is laterally aligned with the central axis of the bore 10. By comparing such readings and making suitable adjustments in the location of the platform relative to the spider arms 85, as previously explained, the central axis of the base 120 can be essentially aligned precisely with the central axis of the bore 10 of the pipe P.

It will be appreciated that the alignment means B may be used with the base 20 in the same manner as described heretofore for the base 120. Thus, the collar 91 would be disposed on the external surface of the base 20 at the shoulder 20b. It should also be understood that the contact member 95a does not have to be connected to a gage but may simply be a contact point or stylus which may be rotated so that when it contacts the flange face F' at some points and misses at others, the operator will know that the base 120 or the base 20 is not properly aligned and the alignment can be adjusted until contact member 95a contacts substantially uniformly throughout each revolution, whether in contact with the face F' or the annular outer edge 100.

After the base 120 or the base 20 is aligned, the locking ring 92 is removed by releasing the set screws 92a and then the collar 91 is also lifted off of the base 120 or 20 so that the alignment means B is completely removed therefrom. Thereafter, the assembly of the rest of the apparatus A is carried out as heretofore described, using either the base 120 or the base 20.

The foregoing disclosure and description of the invention are illustrative and explanatory thereof, and various changes in the size, shape, and materials as well as in the details of the illustrated construction may be made without departing from the spirit of the invention.

I claim:

1. A flange facing machine for facing a flange on a tubular member, comprising:
    a base adapted to fit within the bore of a tubular member having a flange thereon which is to be faced;
    a hollow substantially cylindrical support column surrounding at least a portion of said base and having a lower end;
    securing means securing said support column to said base to prevent relative rotation therebetween;
    single attachment means having a plurality of attaching members at substantially the same elevation for releasably securing said base to the inner wall of the tubular member;
    a rotatable frame mounted on said support column for rotation relative thereto;
    a facing tool secured to said rotatable frame for rotational movement therewith;
    a power means for rotating said rotatable frame;
    a ring gear with said support column near its lower end; and
    means engageable with said ring gear and operable in response to the rotation of said rotatable frame for automatically and continuously feeding said facing tool substantially radially with respect to the bore of the tubular member as said tool is rotated.

2. The structure set forth in claim 1, wherein said base and said support column are separate from each other, and including wherein;
    said securing means is releasably attached to said support column for permitting mounting of said support column on said base after said attachment means is secured to the inner wall of the tubular member.

3. A flange facing machine for facing a flange on a tubular member, comprising:

a base adapted to fit within the bore of a tubular member having a flange thereon which is to be faced;

a support column separate from and mounted on said base;

means for releasably attaching said support column to said base;

attachment means for releasably securing said base to the inner wall of the tubular member;

a rotatable frame mounted on said support column for rotation relative thereto;

a facing tool secured to said rotatable frame for rotational movement therewith;

power means for rotating said rotatable frame;

means operable in response to the rotation of said rotatable frame for automatically and continuously feeding said facing tool substantially radially with respect to the bore of the tubular member as said tool is rotated; and said means for attaching comprising means for expanding said base internally of said support column after said base has been aligned relative to the tubular member for thereby locking said support column to said base in alignment therewith and with the tubular member.

4. The structure set forth in claim 3, wherein:

said base is tubular, is slotted at its upper portion and has internal threads; and said expanding means is an externally threaded tapered member which acts to expand the slotted portion of said base as it is threaded into said threads of said base.

5. The structure set forth in claim 1, including:

means for feeding said facing tool either inwardly or outwardly with respect to the bore of the tubular member as said tool is rotated in the same rotational direction.

6. The structure set forth in claim 1, wherein:

said power means for rotating said rotatable frame is mounted on said support column; and said power means includes an adjustable chain drive to said rotatable frame.

7. A flange facing machine for facing a flange on a tubular member, comprising:

a support column having a base therewith adapted to fit within the bore of a tubular member having a flange thereon which is to be faced;

attachment means for releasably securing said base to the inner wall of the tubular member;

a rotatable frame mounted on said support column for rotation relative thereto;

a facing tool secured to said rotatable frame for rotational movement therewith;

power means for rotating said rotatable frame in one direction;

tool feed means operable in response to the rotation of said rotatable frame for automatically and continuously feeding said facing tool substantially radially either inwardly or outwardly with respect to the bore of the tubular member as said tool is rotated; and shifting means for shifting said tool feed means for selecting the direction of feed of said tool while said frame moves in only said one direction.

8. The structure set forth in claim 7, wherein:

said base has a first base portion which is laterally movable relative to a second base portion secured in a fixed position in the tubular member by said attachment means for obtaining vertical alignment of the axis of said first base portion relative to the axis of the tubular member.

* * * * *